United States Patent
Arici et al.

(10) Patent No.: US 7,738,044 B2
(45) Date of Patent: Jun. 15, 2010

(54) METHOD AND APPARATUS FOR ADJUSTING A CHROMINANCE SIGNAL

(75) Inventors: Tarik Arici, Marietta, GA (US); Yucel Altunbasak, Norcross, GA (US)

(73) Assignee: Vestel Elektronik Sanayi Ve Ticaret A.S., Organize Snaayi Bolgesi (TR)

( * ) Notice: Subject to any disclaimer, the term of this patent is extended or adjusted under 35 U.S.C. 154(b) by 1067 days.

(21) Appl. No.: 11/375,728

(22) Filed: Mar. 15, 2006

(65) Prior Publication Data

US 2007/0216813 A1  Sep. 20, 2007

(51) Int. Cl.
*H04N 5/21* (2006.01)

(52) U.S. Cl. .................................. 348/631; 348/630

(58) Field of Classification Search ......... 348/625–631, 348/606, 252, 253; 382/263, 266, 269
See application file for complete search history.

(56) References Cited

U.S. PATENT DOCUMENTS

| | | | |
|---|---|---|---|
| 5,038,206 A * | 8/1991 | Ubukata | .................. 348/631 |
| 5,418,574 A | 5/1995 | Miyabata | |
| 5,479,216 A * | 12/1995 | Reime | .................. 348/631 |
| 5,920,357 A | 7/1999 | Ohara | |
| 6,600,517 B1 * | 7/2003 | He et al. | .................. 348/625 |
| 7,319,496 B2 * | 1/2008 | Uchida et al. | .................. 348/625 |
| 2003/0107678 A1 | 6/2003 | Lin et al. | |
| 2005/0168644 A1 | 8/2005 | Demas | |

OTHER PUBLICATIONS

European Search Report for Application No. 06254432.5-2202, dated November 28, 2006, 3 pages.

\* cited by examiner

*Primary Examiner*—M. Lee
(74) *Attorney, Agent, or Firm*—Conley Rose, P.C.

(57) ABSTRACT

A composite video signal has a chrominance signal (14) and a luminance signal (10). A method and apparatus are disclosed for adjusting the chrominance signal (14) to obtain an enhanced chrominance signal (15) in which at least some transitions in the enhanced chrominance signal (15) align more closely with edges in the luminance signal (10) than transitions in the original chrominance signal (14) align with edges in the luminance signal (10). An edge in the luminance signal (10) of the composite video signal is detected (11). The position of the edge relative to a current pixel is detected (11). The chrominance of the current pixel is adjusted (13) in accordance with at least the position of said current pixel relative to the edge to obtain an enhanced chrominance signal (15).

36 Claims, 2 Drawing Sheets

METHOD AND APPARATUS FOR ADJUSTING A CHROMINANCE SIGNAL

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates to a method and apparatus for adjusting a chrominance signal of a composite video signal having said chrominance signal and a luminance signal to obtain an enhanced chrominance signal.

BACKGROUND OF THE INVENTION

As is known, picture signals in general have a luminance or brightness signal component, which determines the brightness level of pixels at any particular time, and a chrominance or colour signal component, which determines the colour level of pixels at any particular time. In for example the television formats NTSC, PAL and SECAM, a composite colour video signal includes both luminance and chrominance signals. The way these signals are generated and used differ in detail between the different television formats, but those differences are not material for present purposes. Moreover, the terminology used for the different signals differs between the different formats. Unless the context requires otherwise, the term "luminance" and the term "chrominance" used herein apply equally to the "brightness" and "colour" signals of the composite video signals of any of these television formats and any other equivalent format that uses luminance and chrominance signals.

As is known, in order to achieve backward compatibility with monochrome (black and white) television sets at the time, the colour television formats were set so that the chrominance signal has a narrow bandwidth compared to the luminance signal. The effect of this in practice is that chrominance transitions around colour edges are slower than luminance transitions around the corresponding luminance edges. The way that this manifests itself in the displayed image is that, at an edge in an image, whereas the luminance might for example shift rapidly from a bright region to a neighbouring dark region, the corresponding shift in the chrominance is slower such that there is often a mismatch between the chrominance edges and the luminance edges. This becomes displayed as hue distortions around colour edges such that, for example, red or blue colour can "bleed" into an adjacent region that should be pure white, causing a distortion in the colour of the "white" region at the colour edge. In early colour televisions, this difference was barely visible owing to the relatively poor quality of colour reproduction at the time. However, with more modern television sets, including particularly the large sized displays that can be achieved with LCD and plasma display panels, the visibility of hue distortions around the colour edges has become a more significant problem.

A number of colour enhancement methods are known. For example, in U.S. Pat. No. 5,920,357, there is disclosed a colour transient improvement method in which an enhanced chrominance signal is obtained by selecting one of three signals at different times. The three signals are the original chrominance signal, a derivative of a once-delayed original chrominance signal, and a twice-delayed original chrominance signal. A choice is made between these three signals according to their relative values in order to avoid overshoot and undershoot. However, this method is rather basic and does not produce optimal results.

Another example of colour transient improvement is disclosed in US-A-2003/0107678. The method of this prior art is shown schematically in FIG. 1. An input chrominance signal 1 is passed through a Gaussian filter 2 to remove noise. Then a second derivative with respect to time is taken 3. Using the sign of the second derivative, a correction signal 4 is created. In particular, the sign of the second derivative determines if the correction signal 4 is derived from a local minimum or a local maximum of the chrominance signal. The absolute value of the second derivative is used in a gain control generator 5 to generate a gain control function accordingly. Then, using the correction signal and the gain control function, a chrominance adjustment signal is added to the filtered original chrominance signal in an adder 6 to generate the final output chrominance signal 7. A particular problem with the method of US-A-2003/0107678 is its use of and reliance on the second derivative of the original chrominance signal. This means that in the case that transitions in the chrominance signal are linear, no changes to the chrominance signal will be effected by this prior art method. Moreover, the enhanced colour transitions are still sometimes not aligned with the luminance edges and, in fact, the hue change artefacts around the edges can be made even more visible using this prior art method.

SUMMARY OF THE INVENTION

According to a first aspect of the present invention, there is provided a method of adjusting a chrominance signal of a composite video signal having said chrominance signal and a luminance signal to obtain an enhanced chrominance signal in which at least some transitions in the enhanced chrominance signal align more closely with edges in the luminance signal than transitions in the original chrominance signal align with edges in the luminance signal, the method comprising: detecting an edge in the luminance signal of the composite video signal; determining the position of said edge relative to a current pixel; and, adjusting the chrominance of said current pixel in accordance with at least the position of said current pixel relative to said edge to obtain an enhanced chrominance signal.

The preferred embodiment provides a colour transient improvement that specifically sets out to align chrominance edges more closely with luminance edges and thus reduce hue change artefacts around edges. Because the preferred embodiment does not rely on using the second derivative of the chrominance signal, linear chrominance transitions can also be improved.

In a preferred embodiment, if said edge is prior to the current pixel, the chrominance of said current pixel is adjusted by adding an advanced chrominance signal to the original chrominance signal at the current pixel. The use of an advanced chrominance signal (i.e. a chrominance signal that is "ahead of" the edge) allows better colour transient enhancement to be achieved and helps to overcome noise in the chrominance signal.

The advanced chrominance signal is preferably a weighted advanced chrominance signal, the weight depending on the strength of said edge and being relatively greater for a stronger edge and relatively less for a weaker edge. This embodiment adapts the weight of the colour transient improvement to the local image features by making the colour enhancement stronger where the luminance edges are stronger (i.e. where the transition between a bright and a dark area is more pronounced), and correspondingly by making the colour enhancement less where the luminance edges are weaker. This helps to improve the quality of the colour enhancement and helps to avoid amplification of noise in smooth regions of the image.

The chrominance of said current pixel is preferably adjusted by adding the weighted advanced chrominance signal to the original chrominance signal less a weighted original chrominance signal at the current pixel. In an embodiment, this provides a weighted average of the original chrominance signal and the advanced chrominance signal.

In a preferred embodiment, if said edge is after the current pixel, the chrominance of said current pixel is adjusted by adding a lagged chrominance signal to the original chrominance signal at the current pixel. The use of a lagged chrominance signal (i.e. a chrominance signal that is "behind" the edge) allows better colour transient enhancement to be achieved and helps to overcome noise in the chrominance signal.

The lagged chrominance signal is preferably a weighted lagged chrominance signal, the weight depending on the strength of said edge and being relatively greater for a stronger edge and relatively less for a weaker edge. The chrominance of said current pixel is preferably adjusted by adding the weighted advanced chrominance signal to the original chrominance signal less a weighted original chrominance signal at the current pixel.

The position of the current pixel relative to said edge is preferably determined by applying a window around said current pixel and reducing the size of the window as necessary until the window contains a single edge. The window is preferably a one-dimensional window which extends along a line of said pixels. The use of a window facilitates operation of the method.

In an embodiment, if said edge is prior to the current pixel, the chrominance of said current pixel is adjusted by adding an advanced chrominance signal to the original chrominance signal at the current pixel, wherein: if said original chrominance signal is rising at said edge, the advanced chrominance signal is the maximum chrominance of pixels within the window, and if said original chrominance signal is falling at said edge, the advanced chrominance signal is the minimum chrominance of pixels within the window. This allows the method to produce better results, especially in the presence of noise.

Preferably, the advanced chrominance signal is a weighted advanced chrominance signal, the weight depending on the strength of said edge and being relatively greater for a stronger edge and relatively less for a weaker edge. The chrominance of said current pixel is preferably adjusted by adding the weighted advanced chrominance signal to the original chrominance signal less a weighted original chrominance signal at the current pixel.

In an embodiment, if said edge is after the current pixel, the chrominance of said current pixel is adjusted by adding a lagged chrominance signal to the original chrominance signal at the current pixel, wherein: if said original chrominance signal is rising at said edge, the lagged chrominance signal is the minimum chrominance of pixels within the window, and if said original chrominance signal is falling at said edge, the lagged chrominance signal is the maximum chrominance of pixels within the window. Again, this allows the method to produce better results, especially in the presence of noise.

Preferably the lagged chrominance signal is a weighted lagged chrominance signal, the weight depending on the strength of said edge and being relatively greater for a stronger edge and relatively less for a weaker edge. The chrominance of said current pixel is preferably adjusted by adding the weighted advanced chrominance signal to the original chrominance signal less a weighted original chrominance signal at the current pixel.

In a preferred embodiment, the weight discussed in several places above is a normalised maximum edge signal within the window.

In an embodiment of the method described above, the chrominance of said current pixel is also adjusted in accordance with whether said original chrominance signal is rising or falling at said edge. By taking into account whether said original chrominance signal is rising or falling at said edge, the method is able to produce better results, especially in the presence of noise.

In an embodiment of the method described above, the chrominance of said current pixel is also adjusted in accordance with the strength of said edge. This helps to improve the quality of the colour enhancement and helps to avoid amplification of noise in smooth regions of the image.

The method is preferably repeated for plural pixels in a line of pixels. As will be discussed further below, the greatest benefits are obtained when improving colour transitions in a horizontal direction across rows of pixels in the image. Nevertheless, the method may alternatively or additionally be applied vertically to columns of pixels in the image.

According to a second aspect of the present invention, there is provided apparatus for adjusting a chrominance signal of a composite video signal having said chrominance signal and a luminance signal to obtain an enhanced chrominance signal in which at least some transitions in the enhanced chrominance signal align more closely with edges in the luminance signal than transitions in the original chrominance signal align with edges in the luminance signal, the apparatus comprising: an edge detector arranged to detect an edge in the luminance signal of a composite video signal; an edge position detector arranged to determine the position of said edge relative to a current pixel; and, a chrominance adjuster arranged to adjust the chrominance of said current pixel in accordance with at least the position of said current pixel relative to said edge to obtain an enhanced chrominance signal.

In a preferred embodiment, the chrominance adjuster is arranged such that if said edge is prior to the current pixel, the chrominance of said current pixel is adjusted by adding an advanced chrominance signal to the original chrominance signal at the current pixel. The chrominance adjuster is preferably arranged such that the advanced chrominance signal is a weighted advanced chrominance signal, the weight depending on the strength of said edge and being relatively greater for a stronger edge and relatively less for a weaker edge. The chrominance adjuster is preferably arranged such that the chrominance of said current pixel is adjusted by adding the weighted advanced chrominance signal to the original chrominance signal less a weighted original chrominance signal at the current pixel:

In a preferred embodiment, the chrominance adjuster is arranged such that if said edge is after the current pixel, the chrominance of said current pixel is adjusted by adding a lagged chrominance signal to the original chrominance signal at the current pixel. The chrominance adjuster is preferably arranged such that the lagged chrominance signal is a weighted lagged chrominance signal, the weight depending on the strength of said edge and being relatively greater for a stronger edge and relatively less for a weaker edge.

The chrominance adjuster is preferably arranged such that the chrominance of said current pixel is adjusted by adding the weighted advanced chrominance signal to the original chrominance signal less a weighted original chrominance signal at the current pixel.

The edge position detector is preferably arranged such that the position of the current pixel relative to said edge is determined by applying a window around said current pixel and reducing the size of the window as necessary until the window contains a single edge. The window is preferably a one-dimensional window which extends along a line of said pixels.

In an embodiment, the chrominance adjuster is arranged such that if said edge is prior to the current pixel, the chrominance of said current pixel is adjusted by adding an advanced chrominance signal to the original chrominance signal at the current pixel, wherein: if said original chrominance signal is rising at said edge, the advanced chrominance signal is the maximum chrominance of pixels within the window, and if said original chrominance signal is falling at said edge, the advanced chrominance signal is the minimum chrominance of pixels within the window.

The chrominance adjuster is preferably arranged such that the advanced chrominance signal is a weighted advanced chrominance signal, the weight depending on the strength of said edge and being relatively greater for a stronger edge and relatively less for a weaker edge. The chrominance adjuster is preferably arranged such that the chrominance of said current pixel is adjusted by adding the weighted advanced chrominance signal to the original chrominance signal less a weighted original chrominance signal at the current pixel.

In an embodiment, the chrominance adjuster is arranged such that if said edge is after the current pixel, the chrominance of said current pixel is adjusted by adding a lagged chrominance signal to the original chrominance signal at the current pixel, wherein: if said original chrominance signal is rising at said edge, the lagged chrominance signal is the minimum chrominance of pixels within the window, and if said original chrominance signal is falling at said edge, the lagged chrominance signal is the maximum chrominance of pixels within the window.

The chrominance adjuster is preferably arranged such that the lagged chrominance signal is a weighted lagged chrominance signal, the weight depending on the strength of said edge and being relatively greater for a stronger edge and relatively less for a weaker edge. The chrominance adjuster is preferably arranged such that the chrominance of said current pixel is adjusted by adding the weighted advanced chrominance signal to the original chrominance signal less a weighted original chrominance signal at the current pixel.

In a preferred embodiment, the chrominance adjuster is arranged such that the weight is a normalised maximum edge signal within the window.

In an embodiment, the chrominance adjuster is arranged such that the chrominance of said current pixel is also adjusted in accordance with whether said original chrominance signal is rising or falling at said edge.

In an embodiment, the chrominance adjuster is arranged such that the chrominance of said current pixel is also adjusted in accordance with the strength of said edge.

The apparatus is preferably arranged to operate on plural pixels in a line of pixels.

The preferred apparatus and/or method may be incorporated into any apparatus and/or method that is used to enhance the colour transients of a digital image, including for example an image processor used in a television set or the like, television broadcast capture cards, digital image processing software, etc., etc. The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENT

The main purpose of the preferred embodiment described herein is to align chrominance transition edges more closely with the corresponding luminance transition edges in a composite video signal so as to reduce or eliminate hue change artefacts which can otherwise arise. The most preferred embodiment adapts the weight of the transient improvement to local image features, which helps to prevent noise in smooth regions of the image being amplified.

As is known, composite colour video signals place low-pass filtered chrominance signals in the luminance signals line-by-line in a horizontal direction across rows of pixels. Thus, it is in practice only the horizontal chrominance transitions that are degraded and that are ideally improved. The vertical sampling frequency depends on the number of lines in a frame of the moving image, and no bandwidth reduction is applied to the chrominance signals in the vertical direction. Accordingly, the preferred embodiment operates preferentially only in the horizontal direction across rows of pixels. Nevertheless, the preferred embodiment can be used also in a vertical direction, instead of or in addition to use in a horizontal direction, which might be particularly useful where an image has been resized (especially if increased in size in the vertical direction). It should be noted however that the colour enhancement that can be obtained in the vertical direction may not justify the increased computational complexity.

The method described herein is independent of the type of chrominance signal, which may be for example of the U type (the chrominance blue difference signal) or V type (the chrominance red difference signal). In the preferred embodiment, the method is applied to the chrominance signals separately and independently.

Figure 1:
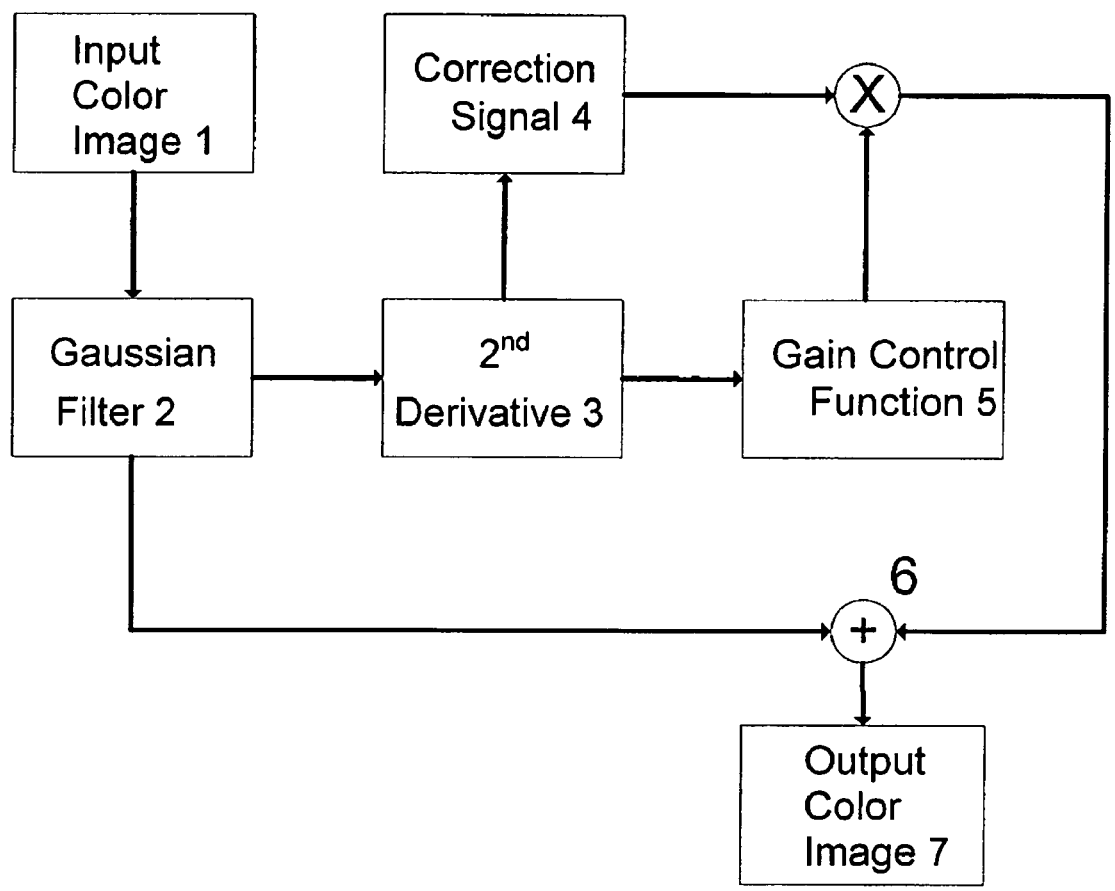
FIG. 1 shows schematically a prior art colour transient improvement method.
Figure 2:
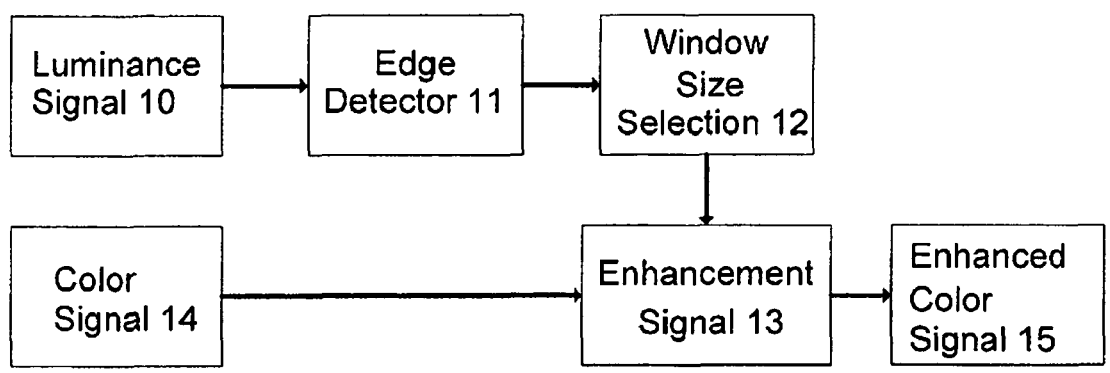
FIG. 2 shows schematically an example of a colour transient improvement method according to en embodiment of the present invention; and, FIG. 3 shows schematically the effect of colour transient improvement on a chrominance signal.

Referring now to the block diagram of FIG. 2, first the luminance signal 10 of a composite video signal is applied as an input to an edge detector 11. The edge detector 11 may be for example a conventional edge detector. If the method is employed in the horizontal direction only, it is necessary for the edge detector 11 to detect only vertical edges in the luminance signal 10. The edge detector 11 outputs an edge map of the signal, which may be a binary map.

The edge detector 11 may be for example of the Laplacian or Gaussian type. However, reference is now made to our co-pending U.S. patent application Ser. No. 11/340,956 filed on 26 Jan. 2006 and entitled "Method and Apparatus for Adjusting the Contrast of an Image", the entire content of which is hereby incorporated by reference. The method of improving contrast disclosed in that patent application uses inter alia an edge detector to detect edges in the luminance signal. The preferred embodiment of the present colour transient improvement method can make use of the output of the edge detector of that contrast enhancement method and thus can advantageously and efficiently use information that is already available in the digital image processing pipeline.

Briefly, in the method disclosed in U.S. Ser. No. 11/340,956, an original input image is filtered by a low pass filter which effectively removes the sharp or high frequency component of the input image to leave an unsharp or low frequency image. This unsharp image is subtracted from the original image in a summer, which therefore outputs the high frequency component. The high frequency component is multiplied with a gain factor obtained from a gain calculator in an amplifier. The amplified high frequency component of the image is then added back to the original input image in a second summer, which outputs the enhanced image. The gain that is provided by the gain calculator is varied in the preferred embodiment of this method, as will be discussed further below.

In adaptive contrast enhancement, mathematically the enhanced or output image $y(m,n)$ is obtained from the input image $x(m,n)$ as:

$$y(m,n) = \mu(m,n) + [1 + g(m,n)][x(m,n) - \mu(m,n)] \quad (1)$$

where m is the row number and n is the column number of the pixels, $\mu(m,n)$ is the local mean of brightness levels, and $g(m,n)$ is the enhancement gain (calculated by the gain calculator). The preferred embodiments use a locally adaptive non-linear filter to find the local mean $\mu(m,n)$ at each pixel. The filter can be regarded as a geometric averager of the brightness levels of the pixels.

The use of such a filter introduces a phase shift in the filtered output. Accordingly, two filters are used. The first filter runs horizontally along a single row of pixels in a first direction, from left to right, and is referred to herein as the forward filter which outputs $\mu F(m,n)$. The second filter runs in the opposite direction, from right to left horizontally along a single row of pixels, and is referred to herein as the backward filter which outputs $\mu B(m,n)$. The local mean $\mu(m,n)$ that is used in the enhancement algorithm is given by the average of the outputs of the two filters, i.e. $\mu(m,n) = \frac{1}{2}[\mu F(m,n) + \mu B(m,n)]$.

The forward and backward filters that are used are each recursive infinite impulse response (IIR) filters. A "recursive" filter is one that uses recursion, i.e. the present value of the output signal is dependent on at least one previously calculated value of the output signal. An IIR filter has an impulse response that is non-zero over an infinite length of time, which is in contrast to finite impulse response (FIR) filters which have impulse responses of finite duration.

In the preferred embodiment, the input-output relationship for the forward filtered $\mu F(m,n)$ is:

$$\mu_F(m,n) = \lambda(m,n)\mu_F(m,n-1) + [1 - \lambda(m,n)]x(m,n) \quad (2)$$

and the input-output relationship for the backward filtered $\mu_B(m,n)$ is:

$$\mu_B(m,n) = \lambda(m,n)\mu_B(m,n+1) + [1 - \lambda(m,n)]x(m,n) \quad (3)$$

As can be seen, for each filter the local mean $\mu F(m,n)$ or $\mu B(m,n)$ at a pixel is dependent on the local mean at a previous pixel (i.e. $\mu F(m,n-1)$ and $\mu B(m,n+1)$ respectively) as well as the brightness level $x(m,n)$ at the current pixel. (Clearly, if attempting to filter the first pixels at the leftmost and rightmost ends of the row of pixels, there is no local mean at a previous pixel to be used in the recursive filters. This can be handled in a number of ways. In one example, the filtering begins at the second pixel from the left of a row for the forward filter and second pixel from the right of the row for the backward filter. In each case, the value that is used for the local mean at the previous pixel in the recursion equations (2) and (3) for these second pixels at the left and right of the row is the original brightness level of the first pixels respectively at the left and right of the row.)

In these filter relationships, $\lambda(m,n)$ is the delay coefficient. As can be seen, each filter has a single pole, namely the delay coefficient $\lambda(m,n)$. As will be discussed further below, this makes the filtering process computationally efficient.

In order to achieve adaptive contrast enhancement as disclosed in U.S. Ser. No. 11/340,956, the delay coefficient $\lambda(m,n)$ is adapted at each pixel to edge information, or information about other areas of high contrast, in the input image. Given that $\lambda(m,n)$ is effectively the weight of the previous output, a higher value of $\lambda(m,n)$ increases the low-pass characteristic of the filter. Accordingly, when an edge is encountered, $\lambda(m,n)$ should be decreased so that the edge will be preserved in the output.

The preferred edge signals that are used are:

$$|\mu_F(m,n-1) - x(m,n)| \quad (4)$$

for the forward filter, and $$|\mu_B(m,n+1) - x(m,n)| \quad (5)$$

for the backward filter. As will be appreciated, these edge signals are the differences between the original pixel value and the previous filter output.

Using these edge signals, $\lambda(m,n)$ for the forward filter is obtained in one example using:

$$\lambda(m,n) = \left[1 - \frac{|\mu_F(m,n-1) - x(m,n)|}{L}\right]^\alpha \quad (6)$$

and for the backward filter using:

$$\lambda(m,n) = \left[1 - \frac{|\mu_B(m,n+1) - x(m,n)|}{L}\right]^\alpha \quad (7)$$

Here, L can be any constant integer up to the maximum possible pixel value less 1, i.e. up to the number of brightness levels available in the input image less 1. In an example, the number of brightness levels available in the input image is 256, so in principle L may be set as any integer up to 255, with a high value (such as 255) being preferred. Preferred values for $\alpha$ are in the range of 5 to 9, with 7 being found to provide particularly good results.

Returning now to the preferred colour transient improvement method, after an edge in the luminance signal has been detected, a one dimensional window is applied around the current pixel, the window extending along the horizontal row of pixels in the preferred embodiment. The size of the window is selected by a window size selector 12 as follows. The window size starts from a maximum value and is then reduced until there is only a single edge on one side of the window. In particular, the window size may be reduced for as long as the logical expression given below is true:

$$\left(\sum_{k=-L}^{-1} E[n+k] > T\right) \& \left(\sum_{k=1}^{L} E[n+k] > T\right) \quad (8)$$

where n is the column number of the current pixel, E[n] is the edge map of the current image line (i.e. the current row of pixels) at n, T is some threshold for edge detection, and the width of the window is 2L+1. (For simplicity, it is assumed that the edge centre is at n=0. Otherwise, all indices must be shifted relative to the edge centre.) To reduce complexity, a small number of values for L may be tried, for example starting with L=7 and then reducing to L=4 and L=1 if necessary. By making the minimum value for L=1, it is guaranteed that for this minimum window size, there will be at most one edge on one side of the window.

An enhancement signal 13 is applied to the original colour or chrominance signal 14. The enhancement signal that is to be added is generated in an enhancement signal generator 13 as follows in the preferred embodiment.

Using the selected window size, the location of the current pixel with respect to the edge in the window is decided. The position of the current pixel in the window relative to the edge can be inferred from the edge strength on two sides of the window. In particular, if the edge strength on one side is stronger than the other, then the edge can be determined to be on the stronger side of the window. An example of how to detect on which side the edge is located is to compare the total edge strengths on the two sides of the window:

$$\text{if } \sum_{k=-L}^{-1} E[n+k] > \sum_{k=1}^{L} E[n+k], \quad (9)$$

then edge is on the left, else, edge is on the right.

If the edge is to the left of the current pixel location, the enhancement signal generator 13 makes use of an advanced colour signal. In a sense, this therefore brings forward (i.e. shifts to the left) the colour signal of a neighbouring pixel or group of pixels, which allows the chrominance transition edge to align more closely with the luminance transition edge. Conversely, when the edge is to the right of the current pixel location, the enhancement signal makes use of a lagged colour signal, with a corresponding effect.

In a straightforward embodiment, the advanced colour signal may be the chrominance signal of the pixel that is say L pixels ahead of the current pixel, where 2L+1 is the selected window size. Correspondingly, in a straightforward case, the lagged colour signal can be the chrominance signal of the pixel that is say L pixels behind the current pixel. In a preferred embodiment, however, the advanced and lagged colour signals depend on the type of the chrominance edge. In particular, depending on whether the chrominance edge is rising or falling at the current pixel, either a maximum or a minimum chrominance signal of pixels within the window is used as follows:

if (C[n−L]<C[n+L]) (which is indicative of a rising chrominance edge):

$C_{LAGGED}[n]=\min\{C[i]\}$, $C_{ADVANCED}[n]=\max\{C[i]\}$ else (for a falling edge):

$C_{LAGGED}[n]=\max\{C[i]\}$, $C_{ADVANCED}[n]=\min\{C[i]\}$, (10)

where C[n] is the colour signal at n.

This helps to improve the colour enhancement that is achieved, and also helps to overcome difficulties arising from noise in the chrominance signal.

The weight of the enhancement signal that is to be added to the original colour signal is preferably varied depending on the strength of the edge in the window. Ideally the enhancement signal has more weight when the edge is strong and less weight when the edge strength is weak, so as to locally adapt the colour transient improvement with the strength of the luminance edge. A number of ways of inferring the edge strength in order to weight the enhancement signal are available. The weight λ in one example can be chosen as the maximum edge signal in the window:

λ=max E[k]    (11)

k∈[−L,L]

where k is the index in the window. The edge signal E[k] is normalised so that λ is in the range [0-1].

Thus, using λ and the lagged and advanced colour signals described above for the most preferred embodiment, the output enhanced colour signal 15 is the weighted average of the original colour signal and the enhancement signal as follows:

$CC[n]=(1-\lambda)C[n]+\lambda C_{LAGGED}[n]$, if edge is to the right, $CC[n]=(1-\lambda)C[n]+\lambda C_{ADVANCED}[n]$, if edge is to the left    (12)

where CC[n] is the output enhanced colour signal, C[n] is the original colour signal, λ is the enhancement weight, and $C_{LAGGED}$ and $C_{ADVANCED}$ are the enhancement signals.

Figure 3:

The effect of the preferred embodiment is shown schematically in FIG. 3 which shows in solid line the transition curve of the input chrominance signal 14 and in dashed lines the corresponding transition curve of the output enhanced chrominance signal 15. The input chrominance signal 14 has slow transitions, indicated by the relatively shallow sloped lines in the transitions from a low value to a high value and vice versa. In contrast, the enhanced chrominance signal has much sharper transitions, which are indicated by the more steeply sloped lines joining the high and low values. Moreover, though not shown in FIG. 3, the transitions between high and low values and vice versa in the enhanced chrominance signal 15 are more closely aligned with the luminance edges (not shown).

The preferred embodiment therefore provides for colour transient improvement that can be applied to digital composite video signals in which chrominance edges are more closely aligned with luminance edges to reduce hue change artefacts around edges. Because for example the preferred embodiment does not use the second derivative of the chrominance signal, linear chrominance transitions can also be improved. A weighted average of the original chrominance signal and an enhancement signal is used in the preferred embodiment in order to improve the quality of the colour enhancement, to avoid amplification of noise in smooth colour regions of the image, and to avoid overshooting and undershooting at the transitions. The preferred embodiment is computationally efficient and thus can be practically applied in consumer equipment, including for example television sets, broadcast television capture cards for personal computers and the like, etc. In the preferred embodiment, the method is applied to the chrominance signals separately and independently. For example, the method is preferably applied to both the U and the V chrominance signals of a YUV type composite video signal. In this example, the enhanced U signal is obtained from the position of luminance edges and minimum and maximum values of U in a window, and correspondingly the enhanced V signal is obtained from the position of luminance edges and minimum and maximum values of V in a window.

Embodiments of the present invention have been described with particular reference to the examples illustrated. However, it will be appreciated that variations and modifications may be made to the examples described within the scope of the present invention.

The invention claimed is:

1. A method of adjusting a chrominance signal of a composite video signal having said chrominance signal and a luminance signal to obtain an enhanced chrominance signal in which at least some transitions in the enhanced chrominance signal align more closely with edges in the luminance signal than transitions in the original chrominance signal align with edges in the luminance signal, the method comprising:
   detecting an edge in the luminance signal of the composite video signal;
   determining the position of said edge relative to a current pixel; and,
   adjusting the chrominance of said current pixel in accordance with at least the position of said current pixel relative to said edge to obtain an enhanced chrominance signal, wherein if said edge is prior to the current pixel, the chrominance of said current pixel is adjusted by adding an advanced chrominance signal to the original chrominance signal at the current pixel.

2. A method according to claim 1, wherein the advanced chrominance signal is a weighted advanced chrominance signal, the weight depending on the strength of said edge and being relatively greater for a stronger edge and relatively less for a weaker edge.

3. A method according to claim 2, wherein the chrominance of said current pixel is adjusted by adding the weighted advanced chrominance signal to the original chrominance signal less a weighted original chrominance signal at the current pixel.

4. A method according to claim 1, wherein if said edge is after the current pixel, the chrominance of said current pixel is adjusted by adding a lagged chrominance signal to the original chrominance signal at the current pixel.

5. A method according to claim 4, wherein the lagged chrominance signal is a weighted lagged chrominance signal, the weight depending on the strength of said edge and being relatively greater for a stronger edge and relatively less for a weaker edge.

6. A method according to claim 5, wherein the chrominance of said current pixel is adjusted by adding the weighted advanced chrominance signal to the original chrominance signal less a weighted original chrominance signal at the current pixel.

7. A method according to claim 1, wherein the position of the current pixel relative to said edge is determined by applying a window around said current pixel and reducing the size of the window as necessary until the window contains a single edge.

8. A method according to claim 7, wherein the window is a one-dimensional window which extends along a line of said pixels.

9. A method according to claim 7, wherein if said edge is prior to the current pixel, the chrominance of said current pixel is adjusted by adding an advanced chrominance signal to the original chrominance signal at the current pixel, wherein:
   if said original chrominance signal is rising at said edge, the advanced chrominance signal is the maximum chrominance of pixels within the window, and
   if said original chrominance signal is falling at said edge, the advanced chrominance signal is the minimum chrominance of pixels within the window.

10. A method according to claim 9, wherein the advanced chrominance signal is a weighted advanced chrominance signal, the weight depending on the strength of said edge and being relatively greater for a stronger edge and relatively less for a weaker edge.

11. A method according to claim 10, wherein the chrominance of said current pixel is adjusted by adding the weighted advanced chrominance signal to the original chrominance signal less a weighted original chrominance signal at the current pixel.

12. A method according to claim 7, wherein if said edge is after the current pixel, the chrominance of said current pixel is adjusted by adding a lagged chrominance signal to the original chrominance signal at the current pixel, wherein:
   if said original chrominance signal is rising at said edge, the lagged chrominance signal is the minimum chrominance of pixels within the window, and
   if said original chrominance signal is falling at said edge, the lagged chrominance signal is the maximum chrominance of pixels within the window.

13. A method according to claim 12, wherein the lagged chrominance signal is a weighted lagged chrominance signal, the weight depending on the strength of said edge and being relatively greater for a stronger edge and relatively less for a weaker edge.

14. A method according to claim 13, wherein the chrominance of said current pixel is adjusted by adding the weighted advanced chrominance signal to the original chrominance signal less a weighted original chrominance signal at the current pixel.

15. A method according to claim 10, wherein the weight is a normalised maximum edge signal within the window.

16. A method according to claim 1, wherein the chrominance of said current pixel is also adjusted in accordance with whether said original chrominance signal is rising or falling at said edge.

17. A method according to claim 1, wherein the chrominance of said current pixel is also adjusted in accordance with the strength of said edge.

18. A method according to claim 1, comprising repeating the method for plural pixels in a line of pixels.

19. Apparatus for adjusting a chrominance signal of a composite video signal having said chrominance signal and a luminance signal to obtain an enhanced chrominance signal in which at least some transitions in the enhanced chrominance signal align more closely with edges in the luminance signal than transitions in the original chrominance signal align with edges in the luminance signal, the apparatus comprising:
   an edge detector arranged to detect an edge in the luminance signal of a composite video signal;
   an edge position detector arranged to determine the position of said edge relative to a current pixel; and,
   a chrominance adjuster arranged to adjust the chrominance of said current pixel in accordance with at least the position of said current pixel relative to said edge to obtain an enhanced chrominance signal, wherein the chrominance adjuster is arranged such that if said edge is prior to the current pixel, the chrominance of said current pixel is adjusted by adding an advanced chrominance signal to the original chrominance signal at the current pixel.

20. Apparatus according to claim 19, wherein the chrominance adjuster is arranged such that the advanced chrominance signal is a weighted advanced chrominance signal, the weight depending on the strength of said edge and being relatively greater for a stronger edge and relatively less for a weaker edge.

21. Apparatus according to claim 20, wherein the chrominance adjuster is arranged such that the chrominance of said current pixel is adjusted by adding the weighted advanced chrominance signal to the original chrominance signal less a weighted original chrominance signal at the current pixel.

22. Apparatus according to claim 19, wherein the chrominance adjuster is arranged such that if said edge is after the current pixel, the chrominance of said current pixel is adjusted by adding a lagged chrominance signal to the original chrominance signal at the current pixel.

23. Apparatus according to claim 22, wherein the chrominance adjuster is arranged such that the lagged chrominance signal is a weighted lagged chrominance signal, the weight depending on the strength of said edge and being relatively greater for a stronger edge and relatively less for a weaker edge.

24. Apparatus according to claim 23, wherein the chrominance adjuster is arranged such that the chrominance of said current pixel is adjusted by adding the weighted advanced chrominance signal to the original chrominance signal less a weighted original chrominance signal at the current pixel.

25. Apparatus according to claim 19, wherein the edge position detector is arranged such that the position of the current pixel relative to said edge is determined by applying a window around said current pixel and reducing the size of the window as necessary until the window contains a single edge.

26. Apparatus according to claim 25, wherein the window is a one-dimensional window which extends along a line of said pixels.

27. Apparatus according to claim 25, wherein the chrominance adjuster is arranged such that if said edge is prior to the current pixel, the chrominance of said current pixel is adjusted by adding an advanced chrominance signal to the original chrominance signal at the current pixel, wherein:
  if said original chrominance signal is rising at said edge, the advanced chrominance signal is the maximum chrominance of pixels within the window, and
  if said original chrominance signal is falling at said edge, the advanced chrominance signal is the minimum chrominance of pixels within the window.

28. Apparatus according to claim 27, wherein the chrominance adjuster is arranged such that the advanced chrominance signal is a weighted advanced chrominance signal, the weight depending on the strength of said edge and being relatively greater for a stronger edge and relatively less for a weaker edge.

29. Apparatus according to claim 28, wherein the chrominance adjuster is arranged such that the chrominance of said current pixel is adjusted by adding the weighted advanced chrominance signal to the original chrominance signal less a weighted original chrominance signal at the current pixel.

30. Apparatus according to claim 25, wherein the chrominance adjuster is arranged such that if said edge is after the current pixel, the chrominance of said current pixel is adjusted by adding a lagged chrominance signal to the original chrominance signal at the current pixel, wherein:
  if said original chrominance signal is rising at said edge, the lagged chrominance signal is the minimum chrominance of pixels within the window, and
  if said original chrominance signal is falling at said edge, the lagged chrominance signal is the maximum chrominance of pixels within the window.

31. Apparatus according to claim 30, wherein the chrominance adjuster is arranged such that the lagged chrominance signal is a weighted lagged chrominance signal, the weight depending on the strength of said edge and being relatively greater for a stronger edge and relatively less for a weaker edge.

32. Apparatus according to claim 31, wherein the chrominance adjuster is arranged such that the chrominance of said current pixel is adjusted by adding the weighted advanced chrominance signal to the original chrominance signal less a weighted original chrominance signal at the current pixel.

33. Apparatus according to claim 28, wherein the chrominance adjuster is arranged such that the weight is a normalised maximum edge signal within the window.

34. Apparatus according to claim 19, wherein the chrominance adjuster is arranged such that the chrominance of said current pixel is also adjusted in accordance with whether said original chrominance signal is rising or falling at said edge.

35. Apparatus according to claim 19, wherein the chrominance adjuster is arranged such that the chrominance of said current pixel is also adjusted in accordance with the strength of said edge.

36. Apparatus according to claim 19, wherein the apparatus is arranged to operate on plural pixels in a line of pixels.

* * * * *